(12) United States Patent
Messer et al.

(10) Patent No.: US 7,672,743 B2
(45) Date of Patent: Mar. 2, 2010

(54) DIGITAL AUDIO PROCESSING

(75) Inventors: Christopher Messer, Redmond, WA (US); Naveen Thumpudi, Sammamish, WA (US); Raymond Cheng, Sammamish, WA (US); Serge Smirnov, Redmond, WA (US); Wei-ge Chen, Sammamish, WA (US); Timothy Onders, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 628 days.

(21) Appl. No.: 11/114,873

(22) Filed: Apr. 25, 2005

(65) Prior Publication Data

US 2006/0241796 A1    Oct. 26, 2006

(51) Int. Cl.
*G06F 17/00* (2006.01)
*H04J 3/24* (2006.01)
*G01L 19/00* (2006.01)

(52) U.S. Cl. .................. 700/94; 370/474; 704/500
(58) Field of Classification Search ............ 700/94; 370/470–474; 704/500
See application file for complete search history.

(56) References Cited

U.S. PATENT DOCUMENTS

| | | | |
|---|---|---|---|
| 6,999,827 B1 * | 2/2006 | Yong ............................ | 700/94 |
| 2001/0005447 A1 * | 6/2001 | Kawamura et al. ............ | 386/95 |
| 2002/0126703 A1 * | 9/2002 | Kovacevic ................... | 370/487 |
| 2002/0152083 A1 * | 10/2002 | Dokic et al. ................ | 704/500 |
| 2004/0143350 A1 * | 7/2004 | Lin ............................... | 700/94 |
| 2006/0288851 A1 * | 12/2006 | Kawamura et al. ............ | 84/624 |

FOREIGN PATENT DOCUMENTS

WO    WO 9721310 A2 *    6/1997

OTHER PUBLICATIONS

IEC 60958-3, "Digital Audio Interface—Part 3: Consumer Applications", Dec. 1999, IEC, First Edition, pp. 1-23.*
ISO/IEC 11172-3, "Information Technology—Coding of Moving Pictures and Associated Audio for Digital Storage Media up to about 1,5 Mbit/s—Part 3: Audio", Aug. 1, 1993, International Organization for Standardization, First Edition, pp. 1-23.*
Koninklijke Philips Electronics N. V., "Data Sheet UDA1352TS 48 kHz IEC 60958 audio DAC", Nov. 22, 2002, Koninklijke Philips Electronics N. V., preliminary specification, pp. 1-52.*

* cited by examiner

*Primary Examiner*—Curtis Kuntz
*Assistant Examiner*—Daniel R Sellers (57) ABSTRACT

A compressed digital audio signal is transmitted from an audio source along a connection wire to an audio receiver. The digital audio signal can encode digital audio data having different sampling frequencies, frames sizes, and other information. The audio receiver that receives the digital audio signal can decode and convert the compressed digital audio signal into multiple synchronized analog signals, which are used to drive multiple speakers. The audio receiver may also synchronize the audio data with associated video data so that the audio playback and video playback are "in sync", despite delay introduced by the audio signal decoding at the audio receiver.

20 Claims, 6 Drawing Sheets

DIGITAL AUDIO PROCESSING

TECHNICAL FIELD

The invention relates generally to digital audio technology, and more particularly to processing digital audio signals.

BACKGROUND

The audio capabilities of personal computing systems are rapidly growing in sophistication. For example, computing systems are being equipped with CD and DVD players and digital multimedia software that make them attractive as personal multimedia systems, like personal stereos and video players. As such, the audio components and software of personal computing systems are adapting to satisfy the more demanding requirements of higher end audio systems. In addition, multimedia players are being equipped with audio components traditionally associated with personal computing systems, such as mixing features and title, artist, and lyric displays. As such, personal computing technology and digital audio technology are converging.

One relevant component in such audio systems is the interface between a digital audio source (e.g., DVD player or a sound card in a personal computer) and an audio receiver that drives the speakers. Traditionally, digital audio sources convert the digital audio into multiple analog signals before transmitting the audio signals to one or more speakers. In this configuration, multi-channel audio transmission is accomplished from the audio source over a set of analog connection wires to multiple speakers. One category of multi-channel audio is termed "6-channel audio", which transmits audio signals over 6 analog connection wires between the source and the audio receiver. The 6 channels are devoted to two front speaker channels, two back speaker channels, one subwoofer channel, and one center channel. Another category of multi-channel audio, termed "8-channel audio" adds two side speaker channels.

Newer audio technologies, such as Dolby Digital and DTS, provide a compressed digital audio signal over a digital wired connection directly from the digital audio source to the audio receiver, thereby eliminating the need to provide 6/8 wire connections between the source and the audio receiver. The audio receiver then decodes the digital audio data and converts it to analog signals for the appropriate number of audio channels.

However, these technologies have been unable to fully exploit the advantages available in personal computing systems and newer digital audio equipment. For example, existing approaches do not adequately support adjustable compression levels, multiple sampling frequencies, or metadata.

SUMMARY

Implementations described and claimed herein address the foregoing problems by transmitting metadata and other decoding properties with the audio data to allow an audio receiver to properly decode and supplement the transmitted audio. A frame size property allows a decoder to support adjustable frame sizes and, therefore, adjustable compression levels. A sampling frequency property allows the decoder to support multiple sampling rates. Other metadata transmitted with the audio data allows the decoder to extract associated information about the audio content, including song title, song author, album title, and song lyrics. Using these and other features, a digital audio source can generate digital audio with a wide variety of properties and supporting information and then transmit the digital audio and other information over a digital connection to an audio receiver. These features also allow the audio receiver to provide more sophisticated decoding and a richer audio experience.

Other implementations are also described and recited herein.

DETAILED DESCRIPTIONS

An implementation of the described technology provides a compressed digital audio signal that is transmitted from a personal computing system along a connection to an audio receiver. The digital audio signal can encode digital audio data having different sampling frequencies, frames sizes, and other information. The audio receiver that receives the digital audio signal can decode and convert the compressed digital audio signal into multiple synchronized analog signals, which are used to drive multiple speakers. The audio receiver may also synchronize the audio data with associated video data so that the audio playback and video playback are "in sync", despite delay introduced by the audio signal decoding at the audio receiver.

Figure 1:
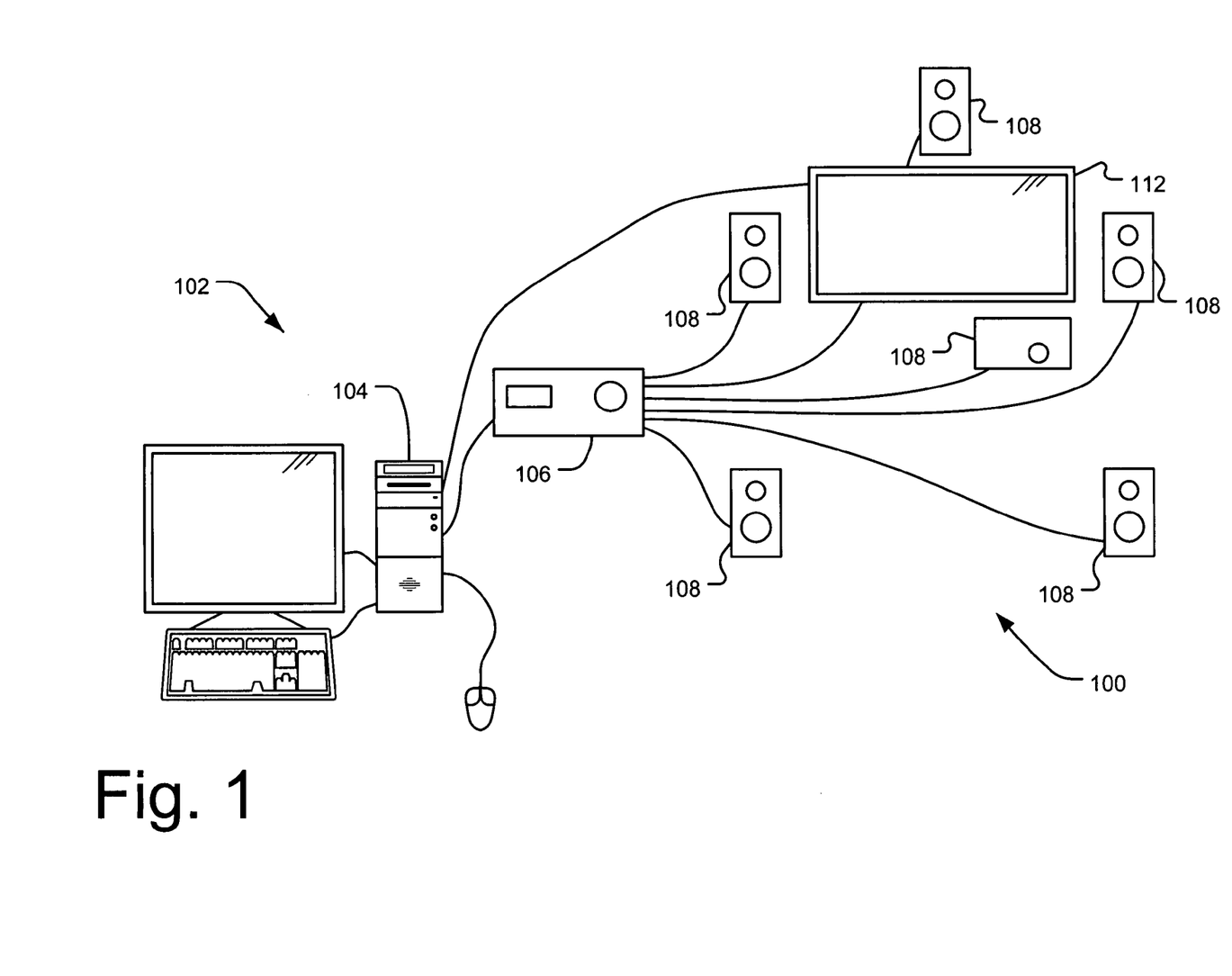
FIG. 1 illustrates an exemplary personal computing system serving multi-channel audio to a multimedia system.

FIG. 1 illustrates an exemplary personal computing system 100 serving multi-channel audio to a 6-channel multimedia system 102. Other multi-channel configurations can support other speaker arrangements having more than 2 channels of audio signals, such as 8-channel audio, etc. A personal computer 104 (an exemplary audio source) includes a sound card that sends digital audio to an audio receiver 106, which decodes the digital audio signals, converts the decoded audio signals to analog signals, and transmits the analog signals via the 6 channels to drive speakers 108. The personal computer 104 may also include a video card that sends video to a video display 112. Other exemplary audio sources may include without limitation set-top boxes, DVD players, etc.

Audio signaling and hardware have long histories of standardization. For example, the International Engineering Consortium (IEC) 60958 standard defines a serial, unidirectional, self-clocking interface for the interconnection of audio equipment over a single wired connection. In one configuration, IEC 60958 specifies a 16-bit, 2-channel optical interface for transmitting a sequence of subframes. Each subframe is normally used to carry one linear pulse-code-modulated (PCM) sample over a 1.5 MB/s connection, although other configurations are also specified. Another standard, IEC 61927, defines a signaling protocol layer on top of IEC 60958 that supports non-linear, compressed bit streams. Special header properties in the IEC 60958 frames indicate that transmitted packets are not merely standard IEC 60958 frames but that they also comply with the IEC 61927 standard. By detecting these header properties, an audio receiver can detect the IEC61927 frames and, therefore, satisfy the decoding requirements of the IEC61927 data.

In one implementation, the audio card of the personal computer 104 includes a port that couples to a standard type plug for a wired connection. The port is capable of outputting a Sony/Phillips Digital Interchange Format (S/PDIF) signal. S/PDIF refers to two distinct features of digital audio communications. First, S/PDIF defines a hardware interface (e.g., a port) that functions as a physical connection between S/PDIF devices. Second, S/PDIF also defines a data protocol that is universal across all S/PDIF devices. The S/PDIF data protocol specifies a standard audio file transfer format that supports different sampling rates and resolutions between 16 bits and 24 bits. In one configuration, for example, the S/PDIF data protocol specifies a standard digital signal format for carrying 2-channel uncompressed 16-bit digital audio data (a total of 32 bits, 16 bits per channel), such as standard IEC 60958 format. The S/PDIF data protocol supports the transfer of digital audio signals from one device to another without having to be converted first to an analog format, thereby maintaining the quality of the original digital signal. In one implementation, the S/PDIF port of the audio card also supports the IEC 61937 format, which generally specifies how compressed audio data may be carried over an IEC 60958 interface by sending a sequence of specially formatted S/PDIF samples as S/PDIF bursts.

The audio receiver 106 includes software for decoding the received audio data in one or more formats. Common formats for the received audio data include without limitation Dolby Digital and DTS, although in the illustrated implementation, the audio receiver 106 includes software for decoding synchronized, compressed digital S/PDIF bursts of multi-channel (i.e., more than 2 channel) audio in IEC 61937 format. Further, the S/PDIF bursts include frame size properties and other information allowing for sophisticated encoding and decoding of digital audio data.

Figure 2:
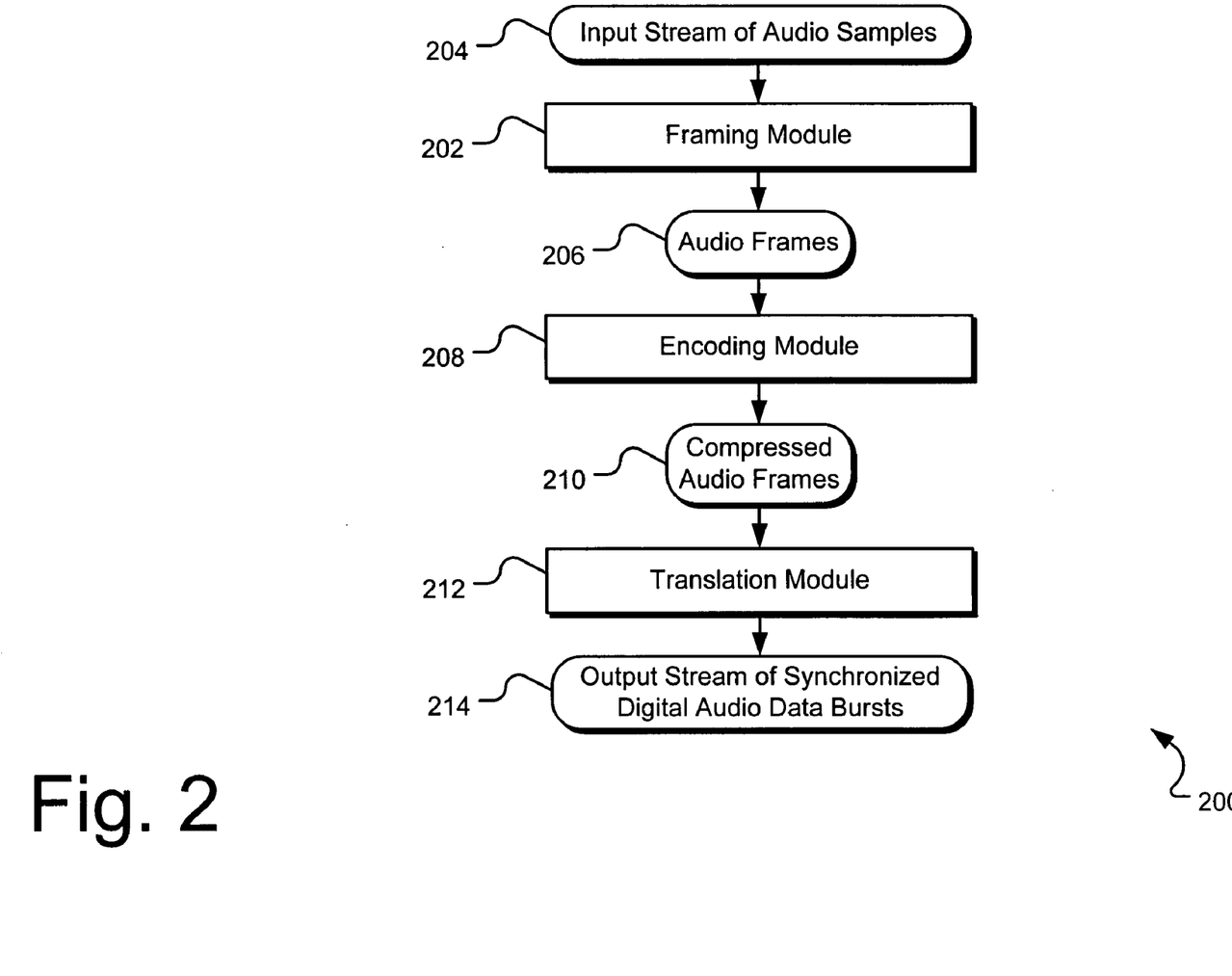
FIG. 2 illustrates exemplary modules for encoding an audio signal.

FIG. 2 illustrates exemplary modules 200 for encoding an audio signal in an audio source, although it should be understood that encoded audio data may also be encoded by any encoding subsystem and transferred to the audio source for transmission (e.g., transferred to the audio source for storage in a local file system and later transmission to an audio receiver). The audio source includes a framing module 202 that receives an initial audio signal as a stream 204 of audio samples that are sampled based on a given sampling frequency, denoted by a sampling frequency property (e.g., x samples per second). In one implementation, audio "snapshots" of analog audio signals are taken at sampling periods inversely corresponding to the sampling frequency. As such, the discrete snapshots form a sequence or stream of digital audio data samples.

The framing module 202 divides the sample stream 204 into audio frames 206, such as 32-bit audio frames according to the S/PDIF standard. Other digital audio frame formats are also contemplated. The number of samples encoded in a single frame is adjustable and characterized by a frame size property, which indicates the number of samples per frame. The framing module 202 or other component may store the frame size property value for a given frame in a local datastore for access by other modules.

An encoding module 208 receives the digital audio frames and compresses them to generate compressed audio frames 210. A variety of coding schemes may be employed, including without limitation predictive coding of mask values, run-length coding of mask values, combinations of run-length coding and vector Huffman coding, frequency extension, multi-channel transforms, and ASF parsing. Exemplary coding schemes are described in U.S. Published Patent Application Nos. 20040044527, entitled "Quantization and Inverse Quantization for Audio", and 20040049379, entitled "Multi-channel Audio Encoding and Decoding", both of which are specifically incorporated by reference herein for all that they disclose and suggest. The compressed audio frames 210 are generally asynchronous and are likely to vary in size (e.g., as measured in bits) from frame to frame because different frames contain different data that may compress to different sizes.

In one implementation, the compressed audio frames 210 conform to the IEC 61937 standard for compressed data and are transmitted as a continuous sequence of IEC 60958 frames. When conveying linear PCM audio, the symbol frequency specified by the IEC 60958 standard is 64 times the PCM sampling frequency (i.e., 32 time slots per PCM sample times the two channels). When conveying a non-linear (e.g., compressed) PCM encoded audio bit-stream, the symbol frequency is 64 times the sampling rate of the audio represented by the encoded bit-stream. An exception is where the encoded bit-stream contains audio with a Low Sampling Frequency (a sampling rate below 25,000 samples per second), in which case the symbol frequency may be 128 times the sampling rate of the encoded audio within the bit-stream. Nevertheless, other standards and extensions of the existing standards are also contemplated.

A translation module 212 receives the asynchronous, compressed audio frames 210 and translates them into a stream 214 of S/PDIF bursts. The translation module 212 also determines various metadata properties, such as by reading the frame size property, the frequency properties, and the metadata from the local datastore. The frame size property and sampling frequency property are encoded into preambles in the S/PDIF bursts, either directly or indirectly. For example, a property may be indirectly encoded into the burst preamble as a data subtype identifier, where certain data subtypes are associated with a particular frame size. Alternatively, a property may be encoded directly into the burst preamble or some other portion of a burst, such as a sampling frequency written into the metadata block of the audio payload.

The stream 214 is transmitted via an audio transmitter (not shown), which can synchronize the audio stream 214 with a related video stream. However, to be synchronized in the presence of decoding by the audio receiver (which introduces an audio decoding delay), the stream 214 is advanced relative to the video stream by a latency period that is dependent on the frame size property. In one implementation, the latency period corresponds to 2⅔ frames, which (based on the frame size property and the sampling frequency) translates into an amount of time.

Figure 3:
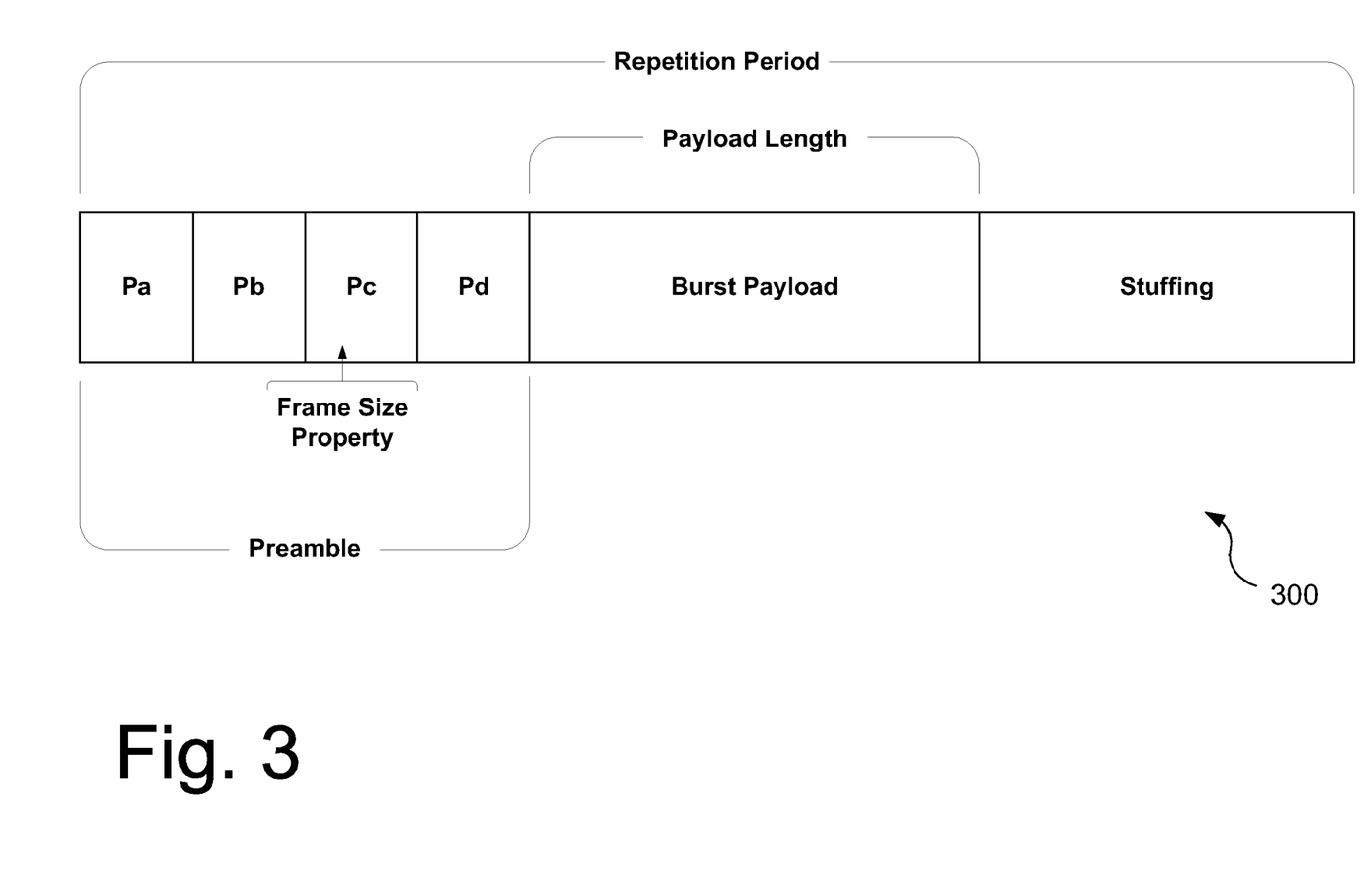
FIG. 3 illustrates a structure of an exemplary S/PDIF burst.

FIG. 3 illustrates a structure of an exemplary S/PDIF burst 300. An S/PDIF burst is a software container that carries compressed audio data. In accordance with the IEC 61937 standard, an S/PDIF burst includes six blocks: The first four blocks, Pa, Pb, Pc, and Pd, are termed "preamble elements", each composed of 16 bits. The fifth block contains the burst payload representing the compressed audio data (i.e., an audio frame or part of an audio frame). The sixth block contains "stuffing", empty bits that fill the S/PDIF burst to its full size to guarantee that the transmission time of the S/PDIF burst is equal to the transmission of the uncompressed audio data. In addition, four IEC 60958 subframes that precede the burst contain "0s" in the time slots 12 to 27.

Of these blocks, Pa and Pb form a 32-bit code (0xF872 in hexadecimal format) indicating that IEC 61937 is in use. The block Pc contains 32 bits specifying data type information: bits 0-4 specify the data type; bits 5-6 specify the data subtype; and the data found in bits 7-15 is specified in the IEC 61937 standard. The block Pd specifies the length of the burst payload, which may vary between 0 bits and (32×repetition period) bits. The repetition period is fixed for each data subtype and matches the number of audio samples per frame except for data subtype I, where a single frame spans two S/PDIF bursts.

Four data subtypes (designated by bits 5-6 of Pc) supported in an S/PDIF burst are listed below with relevant parameters, although other data types may also be supported.

TABLE 1

Data Types

| Bits 5-6 of Pc | Data Subtype | Repetition Period (in sampling periods) | Audio Samples per Audio Frame | S/PDIF Bursts per Audio Frame |
|---|---|---|---|---|
| 0 | Subtype I | 2048 | 4096 (in 2 bursts) | 2 |
| 1 | Subtype II | 2048 | 2048 | 1 |
| 2 | Subtype III | 1024 | 1024 | 1 |
| 3 | Subtype IV | 512 | 512 | 1 |

Data subtype I is primarily intended for use at sample rates above 48 kHz (e.g., 88.2 kHz or 96 kHz) and supports spanning a single compressed audio frame across two S/PDIF bursts by fragmenting the compressed audio frame data. Thus, part of the compressed audio frame data is distributed into each of the two S/PDIF bursts that make up one data subtype I audio frame. The repetition period represents one burst and includes half the audio samples of the audio frame.

Data subtype II, III, and IV incorporate a single compressed audio frame into a single S/PDIF burst. The repetition period is one burst and includes all of the audio samples of the audio frame.

The burst payload carries compressed audio frames and associated information. For convenience, the payload length may be constrained to multiples of 8 to provide an even number of bytes within the payload. The structure of a burst payload portion 400 of the bursts shown in FIG. 4. The first portion of the burst payload 400 includes 32 bits of content descriptor metadata 402. The content descriptor metadata may include descriptive strings that are not the main data but are related to and/or describe the main data, such as song title, song author, album title, and song lyrics. A series of bursts are typically used to communicate most instances of content descriptor metadata.

Figure 4:
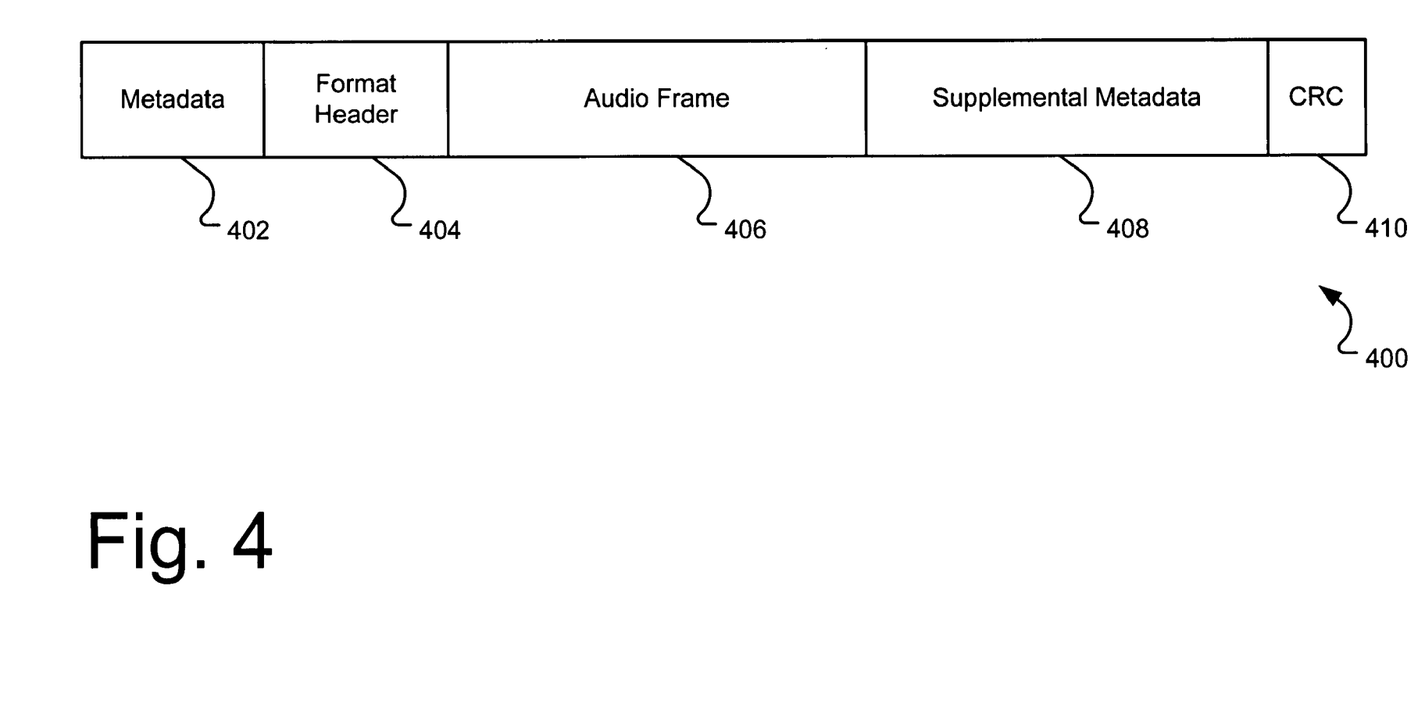
FIG. 4 illustrates a structure of a burst payload portion of an exemplary S/PDIF burst.

Four types of metadata strings supported in an S/PDIF burst include title, author, album, and miscellaneous. A 4-byte block is allocated from each S/PDIF burst for carrying these content descriptors strings. This block indicates:

TABLE 2

Metadata Block Bit Descriptions

| Bits | Name | Description |
|---|---|---|
| 0 | Start | When set, this field signifies the presence of metadata. |
| 1-2 | Type | This field identifies the content of the current metadata string: |

| Bit1 | Bit2 | Description |
|---|---|---|
| 0 | 0 | Title |
| 0 | 1 | Artist |
| 1 | 0 | Album |
| 1 | 1 | Free Text (e.g., for lyrics or liner notes) |

| Bits | Name | Description |
|---|---|---|
| 3-7 | Reserved | Should be set to 0 |
| 8-15 | Byte0 | First byte of the metadata content |
| 16-23 | Byte1 | Second byte of the metadata content |
| 24-31 | Byte2 | Third byte of the metadata content |

The metadata content strings are assembled by the receiver from the byte stream contained in the metadata blocks of multiple bursts. Each byte in the stream represents a UTF-8 character. Metadata blocks may be padded with 0x00, if the metadata string ends before the end of a block. The beginning and end of a string are implied by transitions in the "Type" field.

A 128-bit format header 404 contains the configuration information that can be used to decode the audio bit-stream. Exemplary format header fields are described below:

TABLE 3

Format Header Bit Descriptions

| Bits | Name | Description |
|---|---|---|
| 0-1 | VersNum | Version number of the audio bit stream |
| 2-3 | BPS | Bit depth of the decoded audio samples (00 = 16 bits; 01 = 20 bits; 10 = 24 bits; 11 = Reserved) |
| 4-7 | cChan | Number of audio channels |
| 8-10 | SampRt | Sampling rate of the decoded audio (Hz): 000  44100 001  48000 010  88200 011  96000 100  Reserved 101  Reserved 110  176400 111  192000 |
| 11 | Reserved | Reserved - set to 0 |
| 12 | CRCPresent | TRUE if a CRC for the data burst is present in the last 16 bits of the burst payload |
| 13-15 | Reserved | Reserved - set to 0 |
| 16-31 | WMAPacketSize | Packet size, in bytes |
| 32-34 | cSkipBits | Bit offset of first frame fragment |
| 35 | Discontinuity | TRUE if current payload is discontinuous with previous |

TABLE 3-continued

Format Header Bit Descriptions

| Bits | Name | Description |
|---|---|---|
| | | payload (in previous S/PDIF frame) |
| 36 | StartWMAFrame | TRUE if current payload is the start of a frame, which my not be true if a frame spans multiple S/PDIF bursts (e.g., data subtype I) |
| 37 | WMAMetadata | TRUE if supplemental metadata is present following the end of the audio frame portion of the payload |
| 38-47 | Reserved | Reserved - set to 0 |
| 48-63 | CMap | Channel Map |
| 64-79 | EncOpt | Encoder options structure |
| 80-95 | cFrameSizeBits | Number of bits from start of the content descriptor metadata block to the end of the audio frame data. If zero, assume that the frame fills the entire burst. |
| 96-127 | Reserved | Reserved - set to 0 |

An audio frame portion 406 contains the encoded/compressed digital audio data (i.e., the frame or frame portion). In one implementation, the encoder may produce a stream where the underlying frame sequence is wrapped inside a higher-level container format. The container format may include its own headers. The size of those headers need not be a whole byte multiple. An exemplary header size is given by 6+LOG 2(8*container_unit_size_in_bytes). When the higher-level container format is removed in preparation for transmission over a SPDIF channel, the removal of its headers leaves gaps in the bitstream. When the higher-level header size is not a byte multiple, removing the headers without leaving gaps may require costly bit shifting. Therefore, in some implementations, only the whole-byte-multiple portion of the headers is removed, and the remainders leave small gaps in the bitstream. If the headers in the containing format occur strictly periodically (based on a bit count), the receiver can predict where the gaps will be in each burst and skip them accordingly. Exemplary encoding and decoding employing this feature is illustrated in further detail in the above-referenced patent applications.

The supplemental metadata portion 408 may carry extra information, such as dynamic range control ("DRC") coefficients and custom stereo fold-down matrices. In an exemplary implementation, the supplemental metadata portion 408 is byte-aligned and is headed by a 1-byte identifier tag and a 2-byte size field. The end of an exemplary supplemental metadata portion 408 is indicated by a terminating identifier tag of "0x00". In one implementation, the identifying tag "0x01" represents that the supplemental metadata portion 408 contains DRC coefficients. In another implementation, the identifying tag "0x02" represents that the supplemental metadata portion 408 contains stereo fold-down coefficients. It should be understood that multiple identifying tags may be included concurrently in the supplemental metadata portion 408.

A 16-bit CRC field 410 is used to detect errors in transmission of the S/PDIF bursts of digital audio data. The CRC is byte-aligned and is computed across the content descriptor metadata 402, format header 404, audio frame 406, and supplemental metadata 408.

When video and audio are transmitted concurrently, the decoding latency causes an added delay in the audio playback of more than two audio frames. Therefore, if the video and audio were transmitted in sync, the audio playback would lag the video display by more than two audio frames due to this decoding latency. As such, the transmission of the compressed audio stream is advanced relative to the transmission of the video signal from the personal computer to accommodate the decoding latency. In one implementation, the audio leads the video by 2⅔ frames. For data subtype I bursts, this latency represents 5⅓ burst lengths; for the other data subtypes, this latency represents 2⅔ bursts. Given such latency, when the audio is decoded at the audio receiver, the resulting audio playback is delayed just long enough to be synchronized with the video playback.

Figure 5:
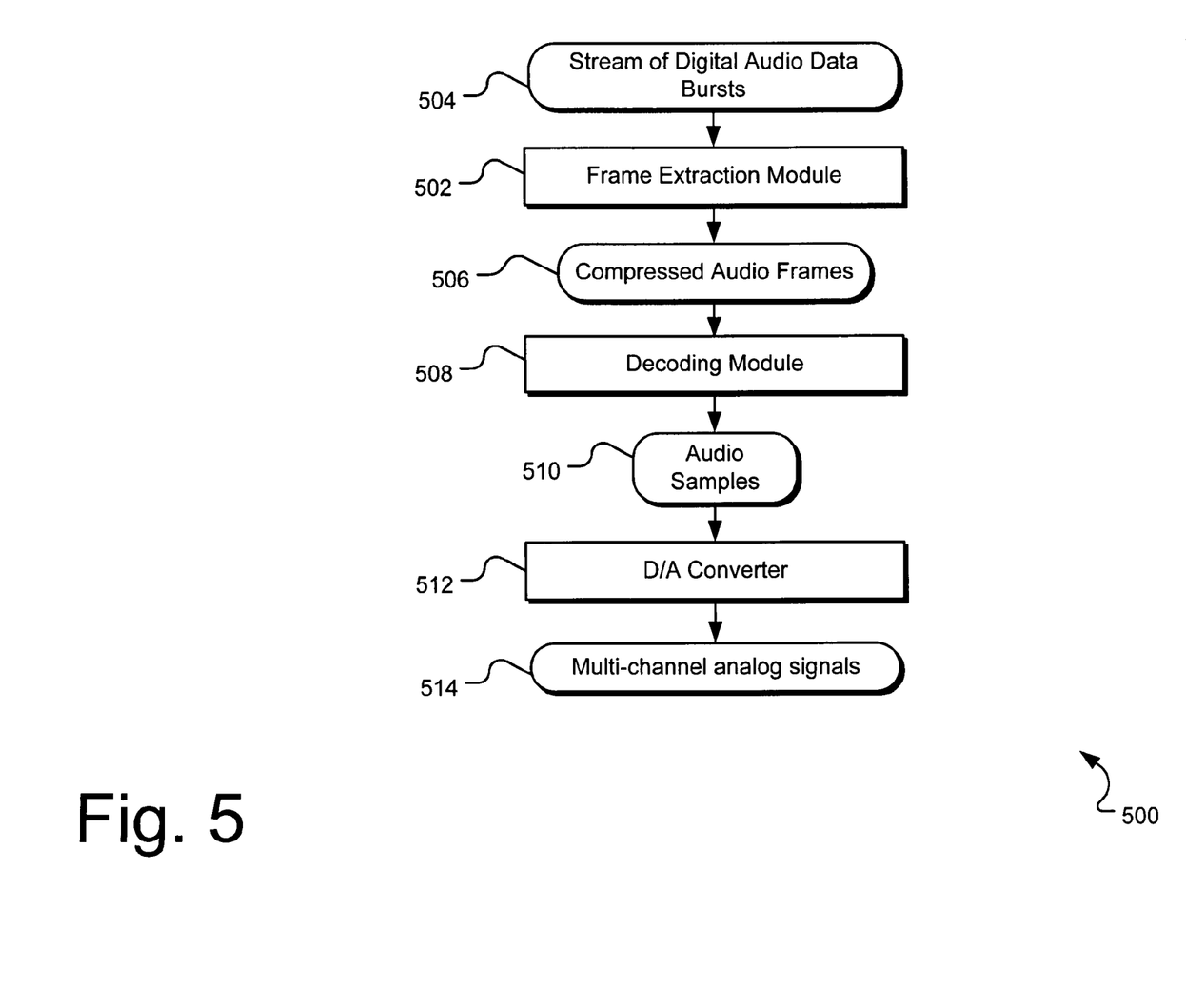
FIG. 5 illustrates exemplary modules for decoding an audio signal.

FIG. 5 illustrates exemplary modules 500 for decoding an audio signal in an audio receiver, although it should be understood that encoded audio data may also be decoded by any decoding subsystem, including a personal computer and a personal audio player. A frame extraction module 502 receives a stream of digital audio bursts 504, wherein each burst contains one or more encoded digital audio frames. The frame extraction module 502 determines the data subtype of each burst and extracts the compressed audio frame 506 from each burst (or the audio frame from multiple bursts), based on the data subtype. Metadata may also be passed along from the frame extraction module 502 to a decoder module 508, including the data subtype, the sampling frequency, and other information.

The decoding module 508 uses the frame size property (e.g., from the data subtype) and sampling frequency (e.g., from the payload's metadata) to decode each burst and to extract the appropriate number of samples 510 from each compressed audio frame 506. The frame size property allows the decoding module 508 to determine how the size of the frames in the burst. Knowledge of the frame size allows the decoding module 508 to anticipate when in the bit-stream each frame header is going to appear. Furthermore, the sampling rate allows the decoding module 508 to determine which Huffman table to use in its decoding, or similarly, allows the decoding module 508 to generate the appropriate Huffman table for the specified sampling rate. Also, using the sampling frequency (e.g., from the payload's metadata), each sample is then converted by the digital to analog converter 512 into multi-channel analog audio signals 514 for transmission to multiple speakers.

In addition, the audio receiver may also make use of the metadata strings in the S/PDIF bursts to provide related useful information to the user. For example, the data bytes of the metadata fields (e.g., bits 8-31) may be concatenated together over multiple bursts to provide strings representing titles, artists, album names, lyrics, and other related information. Such information may be displayed through the user interface of the audio receiver.

Figure 6:
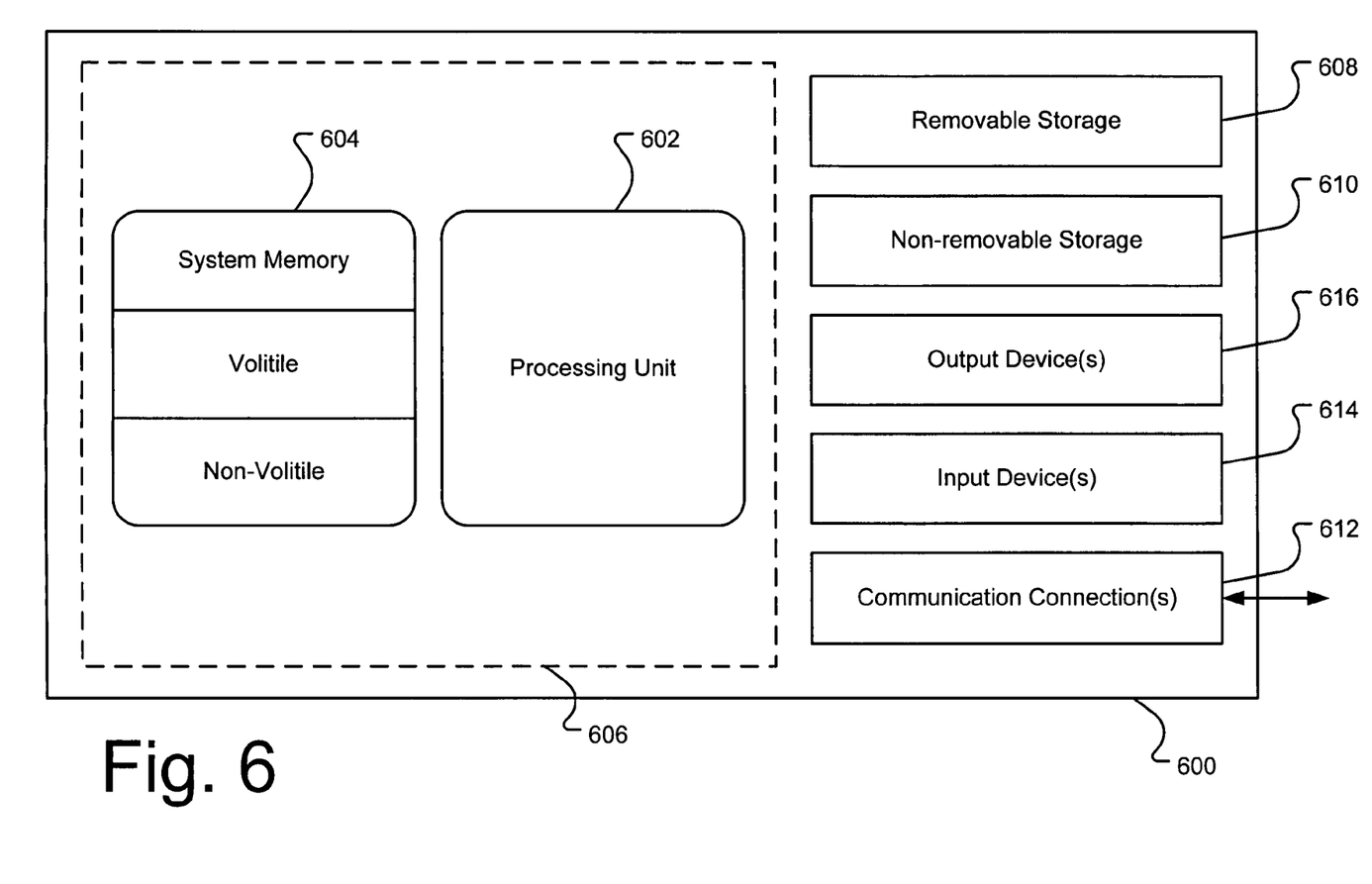
FIG. 6 illustrates a system that may be useful in implementing the described technology.

With reference to FIG. 6, an exemplary system for implementing the invention includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. Additionally, device 600 may also have additional features/functionality. For example, device 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 600. Any such computer storage media may be part of device 600.

Device 600 may also contain communications connection(s) 612 that allow the device to communicate with other devices. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 600 may also have input device(s) 614 such as keyboard, mouse, pen, voice input device, touch input device, etc. Output device(s) 616 such as a display, speakers, printer, etc. may also be included. All these devices are well known in the art and need not be discussed at length here.

For example, in an exemplary implementation, the device 600 may embody an audio source (e.g., a DVD player, a personal multimedia player, or a personal computer) or other similar system. In contrast, in another exemplary implementation, the device 600 may embody an audio receiver or other similar system. Such devices may contain hardware and/or software modules for implementing the technology described herein.

The technology described herein is implemented as logical operations and/or modules in one or more systems. The logical operations may be implemented (1) as a sequence of processor-implemented steps executing in one or more computer systems and (2) as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. In particular, it should be understand that the described technology may be employed independent of a personal computer. Other embodiments are therefore contemplated.

What is claimed is:

1. A method for generating a digital audio signal from one or more digital audio samples, the method comprising:
    receiving a digital audio frame containing a number of the digital audio samples at a computing device comprising a processing unit;
    determining the number of digital audio samples in the digital audio frame; and
    generating the digital audio signal as one or more digital audio bursts containing the digital audio frame, at least one of the digital audio bursts comprising a burst payload and a preamble element specifying a data type and a data subtype, wherein:
        the data subtype specified by the preamble element indicates the number of digital audio samples in the digital audio frame,
        the preamble element supports a plurality of data subtypes and a plurality of sampling frequencies,
        the plurality of data subtypes includes at least one data subtype that supports spanning a digital audio frame sampled at a given sampling frequency across multiple digital audio bursts and at least one other data subtype that supports incorporating the digital audio frame sampled at the given sampling frequency into one digital audio burst, and
        the data subtype that supports spanning the digital audio frame indicates the number of digital audio samples distributed by the multiple digital audio bursts.

2. The method of claim 1 wherein the digital audio samples were sampled at a sampling frequency and further comprising:
    determining the sampling frequency relating to the digital audio samples; and
    supplementing at least one of the digital audio bursts to indicate the sampling frequency.

3. The method of claim 1 further comprising:
    supplementing the one or more digital audio bursts to include metadata relating to the digital audio samples.

4. The method of claim 1 wherein the digital audio frame is one of a sequence of digital audio frames synchronized with a sequence of video frames and further comprising:
    advancing the sequence of digital audio frames by a latency period relative to the sequence of video frames, wherein the latency period represents an amount of time associated with decoding the one or more digital audio bursts for a digital audio frame.

5. The method of claim 4 wherein the latency period is dependent on the number of digital audio samples in the digital audio frame.

6. The method of claim 1 wherein the generating operation distributes the digital audio frame across two of the one or more digital audio bursts.

7. A computer-readable storage medium having computer-executable instructions performing a computer process comprising the method of claim 1.

8. A computer-implemented system for generating a digital audio signal from one or more digital audio samples, the system comprising a processing unit executing computer-executable program modules stored in memory comprising:
    a framing module that receives a digital audio frame containing a number of the digital audio samples and determines the number of digital audio samples in the digital audio frame; and
    a translation module that generates one or more digital audio bursts containing the digital audio frame, at least one of the digital audio bursts comprising a burst payload and a preamble element specifying a data type and a data subtype, wherein:
        the data subtype specified by the preamble element indicates the number of digital audio samples in the digital audio frame,
        the preamble element supports a plurality of data subtypes and a plurality of sampling frequencies,
        the plurality of data subtypes includes at least one data subtype that supports spanning a digital audio frame sampled at a given sampling frequency across multiple digital audio bursts and at least one other data subtype that supports incorporating the digital audio frame sampled at the given sampling frequency into one digital audio burst, and
        the data subtype that supports spanning the digital audio frame indicates the number of digital audio samples distributed by the multiple digital audio bursts.

9. The system of claim 8 wherein the digital audio samples were sampled at a sampling frequency and the translation module further supplements at least one of the digital audio bursts to indicate the sampling frequency.

10. The system of claim 8 wherein the translation module further supplements the one or more digital audio bursts to include metadata relating to the audio samples.

11. The system of claim 8 wherein the digital audio frame is one of a sequence of digital audio frames synchronized with a sequence of video frames and the computer process further comprises:
    an audio transmitter that advances the sequence of digital audio frames by a latency period relative to the sequence of video frames, wherein the latency period represents an amount of time associated with decoding of one or more digital audio bursts for a digital audio frame.

12. The system of claim 11 wherein the latency period is dependent on the number of digital audio samples in the digital audio frame.

13. The system of claim 8 wherein the translation modules distributes the digital audio frame across two of the one or more digital audio bursts.

14. A method for decoding a digital audio signal, the method comprising:
    receiving one or more digital audio bursts containing a digital audio frame at a computing device comprising a processing unit, at least one of the digital audio bursts comprising a burst payload and a preamble element specifying a data type and a data subtype, wherein:
        the data subtype specified by the preamble element indicates the number of digital audio samples in the digital audio frame,
        the preamble element supports a plurality of data subtypes and a plurality of sampling frequencies,
        the plurality of data subtypes includes at least one data subtype that supports spanning a digital audio frame sampled at a given sampling frequency across multiple digital audio bursts and at least one other data subtype that supports incorporating the digital audio frame sampled at the given sampling frequency into one digital audio burst, and
        the data subtype that supports spanning the digital audio frame indicates the number of digital audio samples distributed by the multiple digital audio bursts;
    determining a number of digital audio samples contained within the digital audio frame; and
    decoding the digital audio frame to generate the digital audio samples based on the number of digital audio samples contained within the digital audio frame.

15. The method of claim 14 wherein the digital audio samples were sampled at a sampling frequency and further comprising:
    determining the sampling frequency relating to the digital audio samples from the one or more digital audio bursts; and
    converting the digital audio data samples into one or more analog audio signals based on the sampling frequency.

16. The method of claim 14 further comprising:
    extracting metadata relating to the digital audio data samples from the one or more digital audio bursts.

17. The method of claim 14 further comprising:
    receiving two or more digital audio bursts containing the digital audio frame; and
    extracting the digital audio frame from the two or more digital audio bursts.

18. A computer-readable storage medium having computer-executable instructions performing a computer process comprising the method of claim 14.

19. A system for decoding a digital audio signal, the system comprising:
    a processor;
    a computer-readable storage medium embodying computer-executable instructions performing the method of claim 14, wherein the processor executes the computer-readable instructions.

20. A system for decoding a digital audio signal, the system comprising hardware modules performing the method of claim 14.

* * * * *